UNITED STATES PATENT OFFICE.

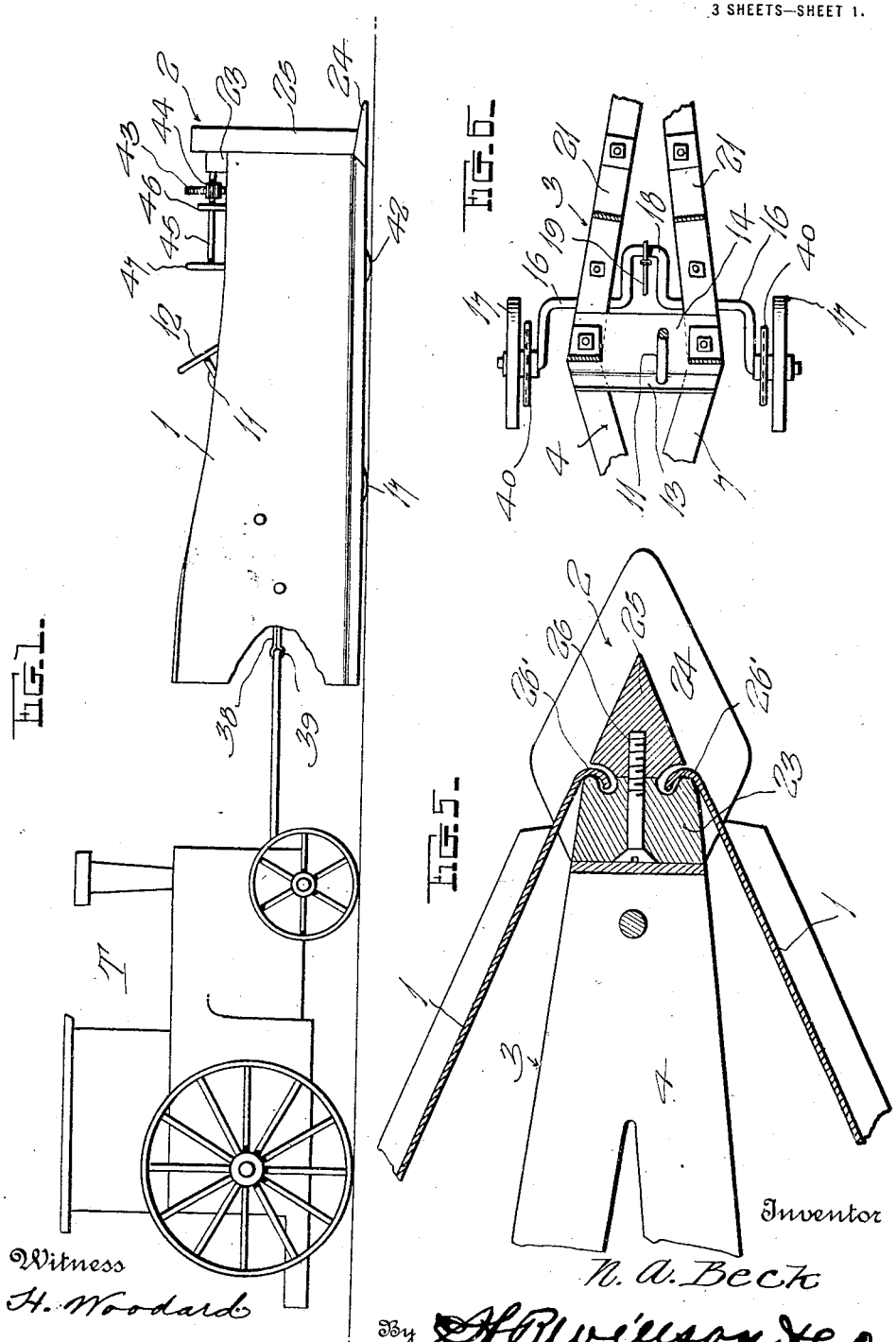

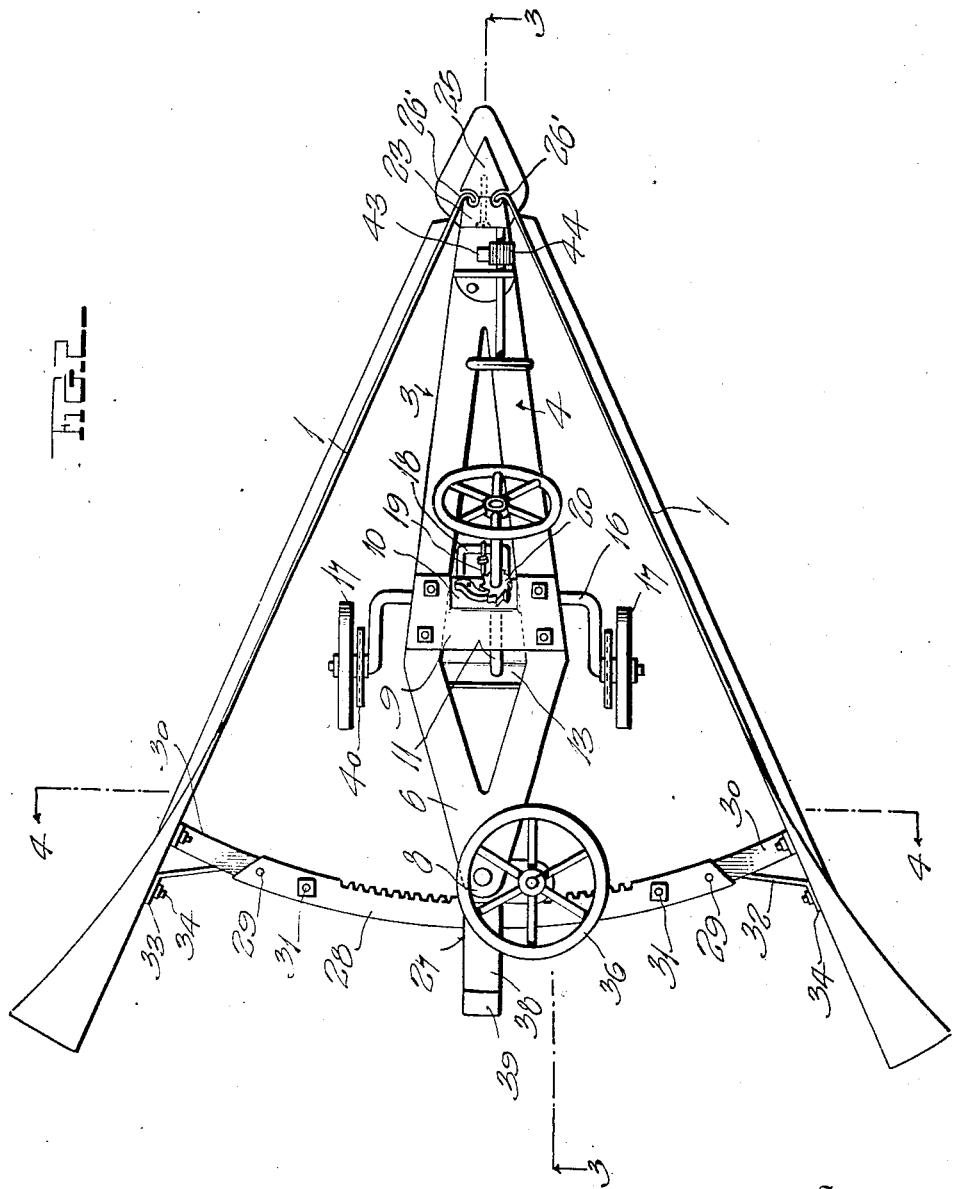

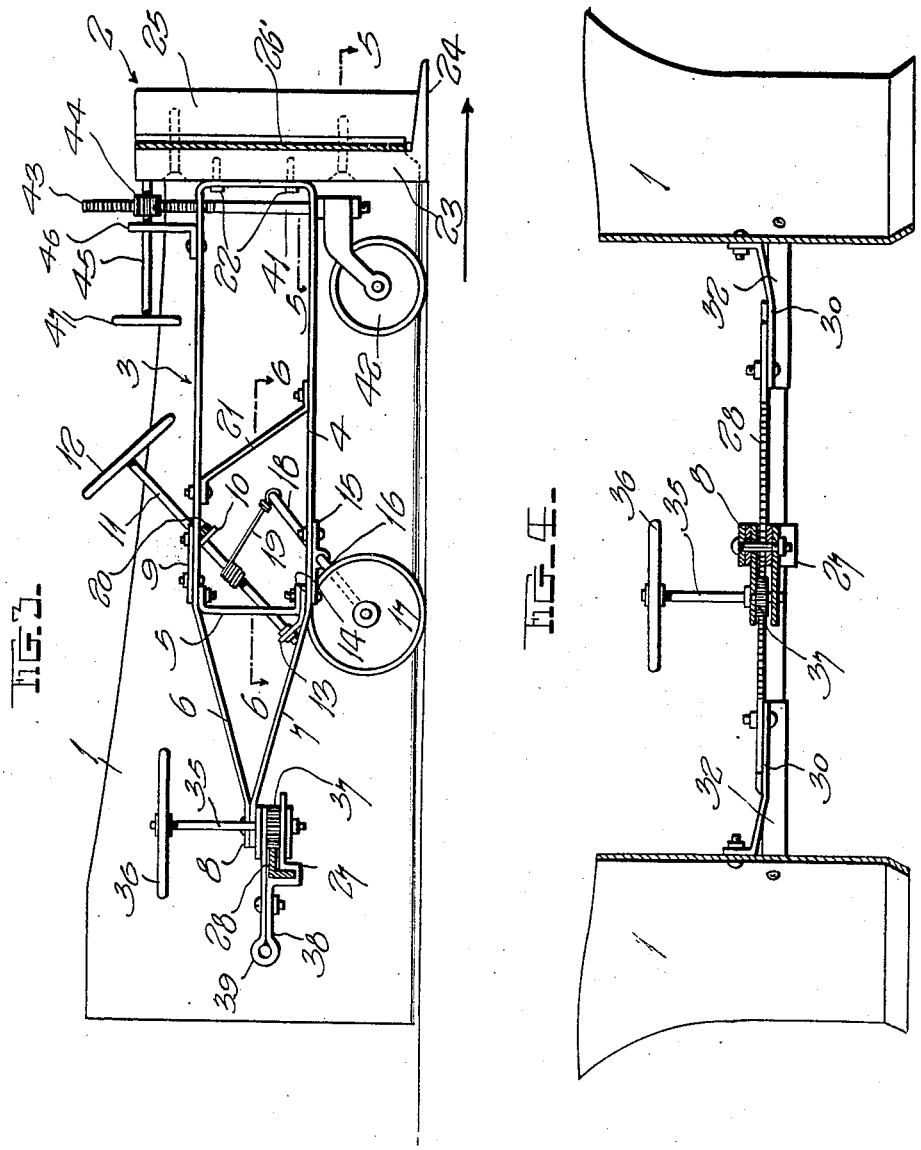

NELS A. BECK, OF ORTONVILLE, MINNESOTA.

SNOW-PLOW.

1,284,562.  Specification of Letters Patent.  Patented Nov. 12, 1918.

Application filed August 13, 1917. Serial No. 185,987.

*To all whom it may concern:*

Be it known that I, NELS A. BECK, a citizen of the United States, residing at Ortonville, in the county of Bigstone and State of Minnesota, have invented certain new and useful Improvements in Snow-Plows; and I do declare the following to be a full, clear, and exact description of the invention, such as will enable others skilled in the art to which it appertains, to make and use the same.

My invention relates to snow plows and the primary object thereof is to provide an improved form and construction of a device of this character in which an efficient regulation of the depth of the plow may be obtained.

An additional object of the invention is to provide in a plow of this character an improved form of mechanism in which the top of the plow may be vertically as well as laterally adjusted independently of the plow point and the plow point vertically adjusted independently of the top.

With these and other objects in view as will appear from the following specification my invention resides in the novel construction, combination and arrangement of parts hereinafter described and claimed.

In the accompanying drawings which form a part of this specification and in which like reference characters designate corresponding parts throughout the several views;

Figure 1 is a side elevation of my improved plow with motive tractor attached at the rear thereof.

Fig. 2 is a top plan view of the plow.

Fig. 3 is a longitudinal vertical section taken substantially on the line 3—3 of Fig. 2.

Fig. 4 is a transverse vertical section on the line 4—4 of Fig. 2.

Fig. 5 is a horizontal section on the line 5—5 of Fig. 3.

Fig. 6 is a detail horizontal section on the line 6—6 of Fig. 3.

In the accompanying drawings I have illustrated my improved snow plow attached at the rear to a tractor T. The plow comprises a pair of blades 1 rearwardly divergent from a point 2 which is carried at the inward end of a longitudinally extending centrally disposed frame 3.

In detail frame 3, comprises a rearwardly extending longitudinally disposed, substantially V-shaped beam 4 having arms thereof disposed in parallel, vertical spaced relation as indicated in Fig. 3 to form the top and bottom beams. Adjacent the rear of this frame these top and bottom beams, are braced by a vertically extending end beam 5 and the rear ends of the top and bottom beams as indicated at 6 and 7 so vergent to their meeting end 8.

The top and bottom beams comprising the arms of the frame member 3 are substantially diamond shaped as illustrated in Fig. 2, the central portions thereof being open. Extending transversely across the open portion of the top beam and disposed at the rear of the frame, is a plate 9 having an inclined lip 10 to provide a bearing for an inclined rearwardly extending rod 11 having a hand wheel 12 on the upper end thereof, the lower end of said rod being mounted in a bearing lip 13 formed on a transversely extending lip plate 14 mounted on the bottom beam of frame 3.

Disposed on opposite sides of the bottom beam of said frame adjacent the beam 5, is a pair of bearings 15 in which is mounted a cranked axle 16 having supporting wheels 17 disposed on the outer ends thereof and having the cranked portion 18 disposed in the open central portion of the bottom diamond shaped beam of the frame, as clearly illustrated in Fig. 6.

A cable 19 is connected at one end to the cranked portion 18 of the axle and is secured at its opposite end to the shank of the rod 11 so that upon rotation of the hand wheel 12 the cable will be wound to draw the cranked portion of the axle upwardly and thereby elevate the rear end of the frame. Suitable ratchet mechanism 20 is provided on the bearing lip 10 so that the frame may be maintained in the adjustment desired.

Disposed centrally in the frame is a forwardly inclined brace beam 21 and secured to the forward vertically disposed end of the frame by means of suitable bolt members 22 is a vertically disposed post 23 having a forwardly extending substantially triangular shaped foot 24 at its lower end to provide a suitable nose for the plow. Secured to the post 23 on the forward side thereof and disposed vertically above the nose 24 is a substantially triangular shaped post 25 retained on post 23 by means of bolts 26, it will be seen that this construction provides an efficient plow point as clearly illustrated in Fig. 5.

The meeting faces of the two posts 23 and 25, are provided at their opposite sides with inwardly extending vertically disposed sockets which, pivotally and loosely receive the bent end 26 of the plow blades. At the rear end 8 of the frame a guide 27 is provided and which is adapted to receive for transverse slidable engagement thereover, a rack bar 28 formed of angle metal and provided at its end with spaced bolt receiving apertures 29 adapted to aline, with similar apertures provided in an inwardly and laterally extending angle metal bar 30 formed on each plow blade, bolts 31 being provided for holding said bars in adjusted position. The ends of the bars 30 adjacent the blades are provided with braces 32 having flared ends 33 adapted to be connected to the blades by suitable bolts 34.

Disposed in the guide 27 is a vertical rod 35 having an operating wheel 36 on its upper end and a spur gear 37, on its lower end said spur gear meshing with the rack bar 28 so that when the wheel 36 is rotated in the direction desired, the rack bar 28 will be moved laterally and by the ratchet connection with the bars 30 blades 1 will be moved laterally in the direction desired. When operating in deep snow movement of the blades in the manner described will serve to guide the plow.

A suitable tongue 38 having an eye 39 at its rear end is disposed longitudinally on the frame and in the rear of the rack bar 28, any suitable source of motive power can be attached to said tongue. However if desired an engine may be mounted in the main frame 3 driving connection being obtained through the sprocket wheel 40 carried by one of the frame supporting wheels.

Disposed vertically and slidable in the forward end of frame is a post 41 having a swiveled wheel 42 on its lower end and provided at its upper end with a rack 43 to be engaged by pinion 44 carried on a rearwardly extending shaft 45 disposed in bearing 46 carried on the upper or top beam of the main frame. The shaft 45 is provided with a hand wheel 47 so that when the same is actuated the forward end of the point of the plow may be vertically adjusted. Suitable ratchet mechanism (not shown) may be provided maintaining the plow in adjusted position.

Owing to the loose pivotal connection that the forward ends of the plow blades have in the sockets formed in the plow point sufficient lateral movement of the blades may be obtained and by rotation of the hand wheel 47 the point of the plow may elevate as desired. It will be seen that by actuation of the hand wheels 12 and 47 the entire machine may be raised or lowered as desired.

While, in the description and in the accompanying drawings I have illustrated and described in detail certain forms of construction and arrangement and location of parts, entering into the construction of my plow, I desire to be understood that I do not intend to specifically limit myself to these but that any such may be utilized, and changes may be made therein, as will fall within the scope of the invention as claimed.

I claim:

1. In a snow plow, a suitably supported longitudinally disposed main frame, a vertically disposed substantially triangular post secured at the front end of said frame and having a forwardly extending enlarged foot, said post forming a point for the plow, bearing sockets in the sides of said post, rearwardly divergent blades having inwardly turned forward ends pivotally engaged in said sockets, an arcuate bar connected to said blades adjacent their rear ends, a guide on the frame for said bar, mechanism on said frame to actuate said bar for simultaneously shifting the pivoted blades, means on the front of said frame to vertically adjust said post and foot, and means on said frame to vertically adjust the body of said frame and blades.

2. In a snow plow, a suitably supported longitudinally disposed main frame, a vertically disposed substantially triangular post secured at the front end of said frame having a forwardly extending enlarged foot, said post forming a point for the plow, bearing sockets in the sides of said post, rearwardly divergent blades having inwardly turned forward ends pivotally engaged in said sockets, an arcuate bar connecting said blades at the rear of the frame, means on said frame for shifting said bar, a swivel supporting wheel for said frame adjacent the front end thereof, a vertically disposed pintle connected to said wheel and extending through said frame, rack teeth on said pintle, a pinion mounted on said frame and meshing with said rack teeth, and means to actuate said pinion for vertically adjusting the point and blades.

In testimony whereof I have hereunto set my hand in the presence of two subscribing witnesses.

NELS A. BECK.

Witnesses:
 OSCAR E. HAHN,
 WAYNE KELLY.